United States Patent

[11] 3,532,178

| [72] | Inventor | Karl Bertil Lindbom<br>Karlskoga, Sweden |
|---|---|---|
| [21] | Appl. No. | 762,754 |
| [22] | Filed | Sept. 26, 1968 |
| [45] | Patented | Oct. 6, 1970 |
| [73] | Assignee | Aktiebolaget Bofors<br>Bofors, Sweden |
| [32] | Priority | Sept. 29, 1967 |
| [33] | | Sweden |
| [31] | | 13,386/67 |

[54] VEHICLE HAVING FOUR WHEELS STEERABLE ABOUT ASSOCIATED VERTICAL STEERING AXES
4 Claims, 5 Drawing Figs.

[52] U.S. Cl. .................................................. 180/79.2,
280/91
[50] Field of Search .......................................... 180/79.1,
79.2, 45; 280/91

[56] References Cited
UNITED STATES PATENTS
| 2,512,979 | 6/1950 | Strother.................. | 180/79.2 |
| 3,387,684 | 6/1968 | Belke et. al.............. | 180/79.2 |

*Primary Examiner* — A. Harry Levy
*Attorney* — Hane and Baxley

ABSTRACT: A vehicle provided with four wheels individually steerable about associated vertical steering axes and a power steering system comprising servo steering means for turning the steerable wheels about their steering axes in response to a steering wheel or a similar steering control member of the vehicle so that when making a turn with the vehicle the pair of a fore wheel and a rear wheel constituting the inner wheel pair in the turn run along a common first arc of a circle and the pair of a fore wheel and a rear wheel constituting the outer wheel pair in the turn run along a common second arc of a circle having the same centre of curvature as said first arc of a circle.

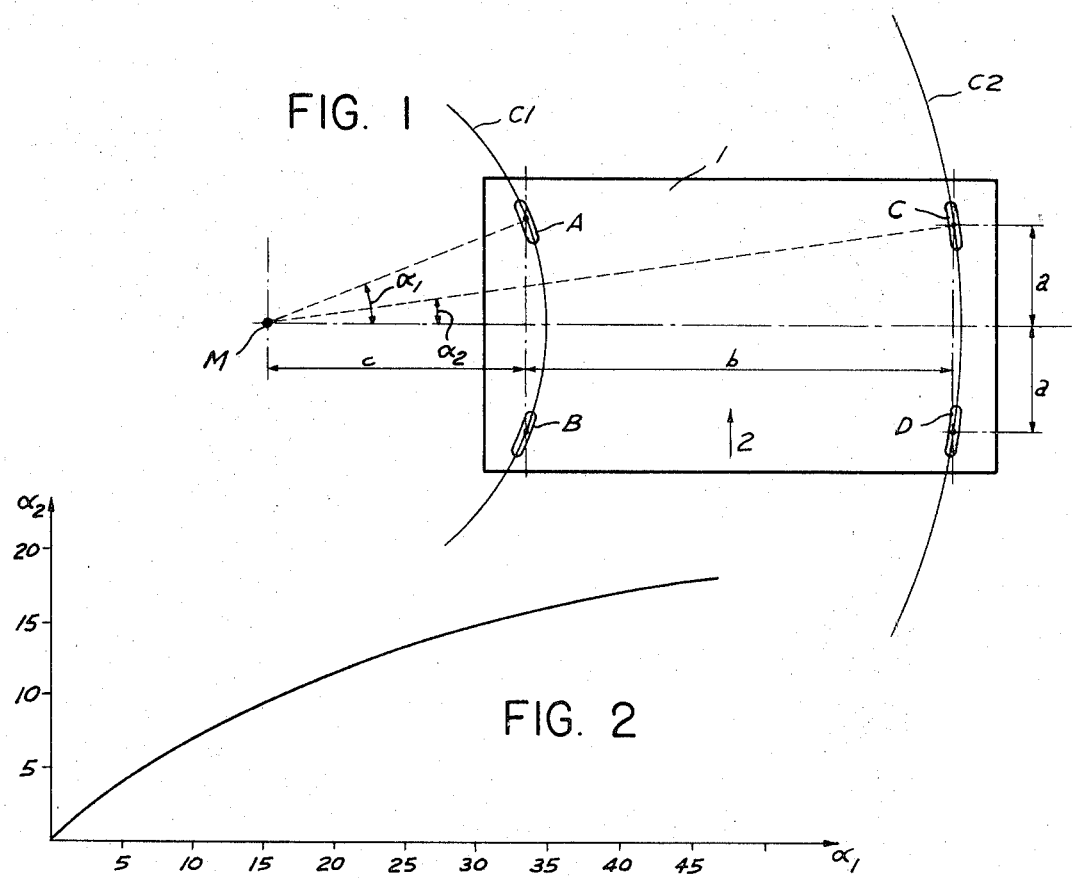
FIG. 1
FIG. 2
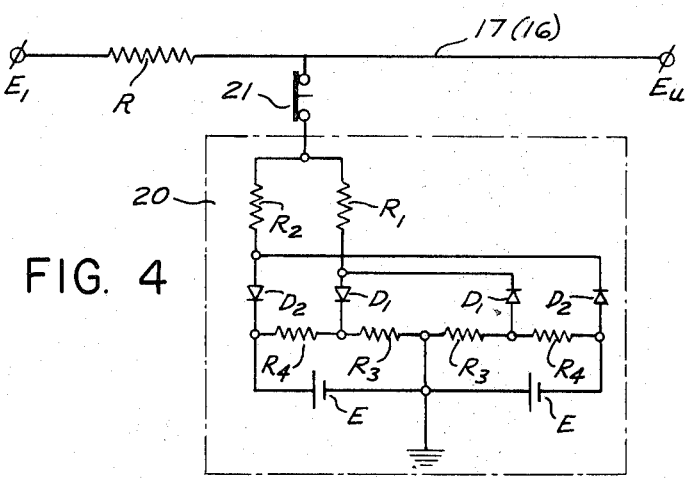
FIG. 4
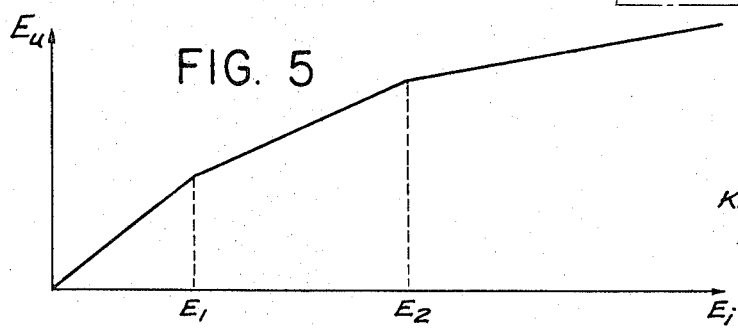
FIG. 5
INVENTOR.
KARL BERTIL LINDBOM

VEHICLE HAVING FOUR WHEELS STEERABLE ABOUT ASSOCIATED VERTICAL STEERING AXES

The present invention relates to a vehicle provided with four wheels which for the steering of the vehicle are all steerable about associated vertical steering axes, and a steering system responsive to a steering wheel or a similar steering control member of the vehicle for turning said steerable wheels about their associated vertical steering axes in such a manner that when making a turn with the vehicle the one pair of a fore wheel and a rear wheel mounted one after the other in the direction of driving of the vehicle will run along an arc of a first circle common to said one pair of wheels and the other pair of a fore wheel and a rear wheel mounted one after the other in the driving direction of the vehicle will run along an arc of a second circle common to said other pair of wheels and said first and second circles have substantially the same centre of curvature.

The French Pat. No. 1,474,238 discloses a vehicle, more particularly a gantry crane, having a steering geometry of the type mentioned above. As discussed in detail in said patent, a steering geometry of this type requires that when making a turn with the vehicle the two inner wheels in the turn are steered to equally large but opposite steering angles relative to the neutral or straightahead position of the wheels and that also the two outer wheels in the turn are steered to equally large but opposite steering angles, but that the steering angle for the outer wheel pair is smaller than the steering angle for the inner wheel pair. The ratio between the steering angle of the outer wheel pair and the steering angle of the inner wheel pair will depend on the mutual distance or spacing between the different wheels and is also a nonlinear function of the desired turning radius for the vehicle, that is the distance from the vehicle to the desired turning centre. The gantry crane described in the above mentioned patent specification is provided with a steering system for turning the four steerable wheels of the vehicle in response to the rotation of the steering wheel of the vehicle, in which system the necessary relationship between the steering angle for the outer wheel pair in the turn and the steering angle for the inner wheel pair in the turn is obtained by means of mechanical cam paths which are rotated in response to the rotation of the steering wheel and from which the control signals necessary for the turning of the four steerable wheels of the vehicle are derived and applied to the steering means of the wheels. The use of such mechanical cam paths gives, however, considerable difficulties and complications. Thus the cam paths must be manufactured with a comparatively great accuracy and any adjustments of the cam paths that may be necessary for the trimming of the complete steering system will be very difficult and laborious to make. Obviously at least one cam path is required for each pair of wheels and the derivation of the necessary control signals from these cam paths and the transmission and application of these control signals to the steering means of the steerable wheels requires comparatively complicated mechanical devices which must be designed and manufactured with great accuracy if an accurate steering of the vehicle is to be obtained. These difficulties are still greater if the vehicle, as the gantry crane described in said patent specification, shall be drivable in two mutually orthogonal driving directions, that is both in its longitudinal and its transversal direction. In this case no less than four mechanical cam paths are necessary, from which the control signals for the turning of the steerable wheels shall be derived alternatively dependent on the direction of driving of the vehicle. The problem becomes still more complicated if the wheel base and/or the track width of the vehicle is variable, which may be desired in certain types of vehicles as for instance gantry cranes, because as mentioned above the shape of the cam paths depends on the mutual spacing or distance between the steerable wheels of the vehicle and must consequently be changed when the wheel base and/or the track width is changed.

The object of the present invention is therefore to provide an improved steering system for the steering of four independently steerable wheels of a vehicle in response to the rotation of the steering wheel or a similar steering control member of the vehicle which steering system gives the steering geometry described above, but does not require any mechanical cam paths.

In the steering system according to the invention this is achieved in that each one of the four steerable wheels of the vehicle is provided with an electrically controlled steering servo means for turning the wheel about its vertical steering axis an angle relative to a predetermined neutral position for the wheel corresponding to an electric input signal supplied to the steering servo means, that an electric signal generator is coupled to a steering wheel or a similar steering member of the vehicle for generating an electric output signal corresponding to the angle of rotation of the steering wheel from a predetermined neutral position, the output of said signal generator being electrically connected to the inputs of said steering servo means of all said steerable wheels, and that switching means responsive to the direction of rotation of the steering wheel from its neutral position are arranged to connect an electric signal attenuating network into the signal connection between said signal generator and the steering servo means of the pair of steerable wheels which in the turning of the vehicle caused by the rotation of the steering wheel constitute the outer wheel pair in the turn, said signal attenuating network having an attenuation factor dependent of the magnitude of the output signal from the signal generator in such a way that the two different arcs of circles along which respectively the outer wheel pair and the inner wheel pair of the vehicle run during the turn will have substantially the same centre of curvature.

The signal attenuating network may be of a very simple design and may for instance preferably consist of a number of parallel branches connected to the signal connection between the signal generator coupled to the steering wheel and the steering servo means of the wheel pair in question and each comprising resistances connected in series biased diodes. In such an attenuating network the attenuating characteristic of the network can be easily adjusted to the desired relationship between the steering angle of the inner wheel pair and the steering angle of the outer wheel pair by variation of the values of the resistances in the different parallel branches and the biases of the diodes.

In the following the invention will be further described with reference to the accompanying drawing, in which:

FIG. 1 illustrates schematically the desired steering geometry for a vehicle according to the invention;

FIG. 2 is a diagram illustrating the desired relationship between the steering angle of the outer wheel pair and the steering angle of the inner wheel pair for a certain mutual location of the steerable wheels of the vehicle;

FIG. 4 shows the circuit diagram for a preferred design of the electric signal attenuating network in the steering system in FIG. 3; and FIG. 5 illustrates the attenuation characteristic of the attenuating network shown in FIG. 4.

Figure 3:
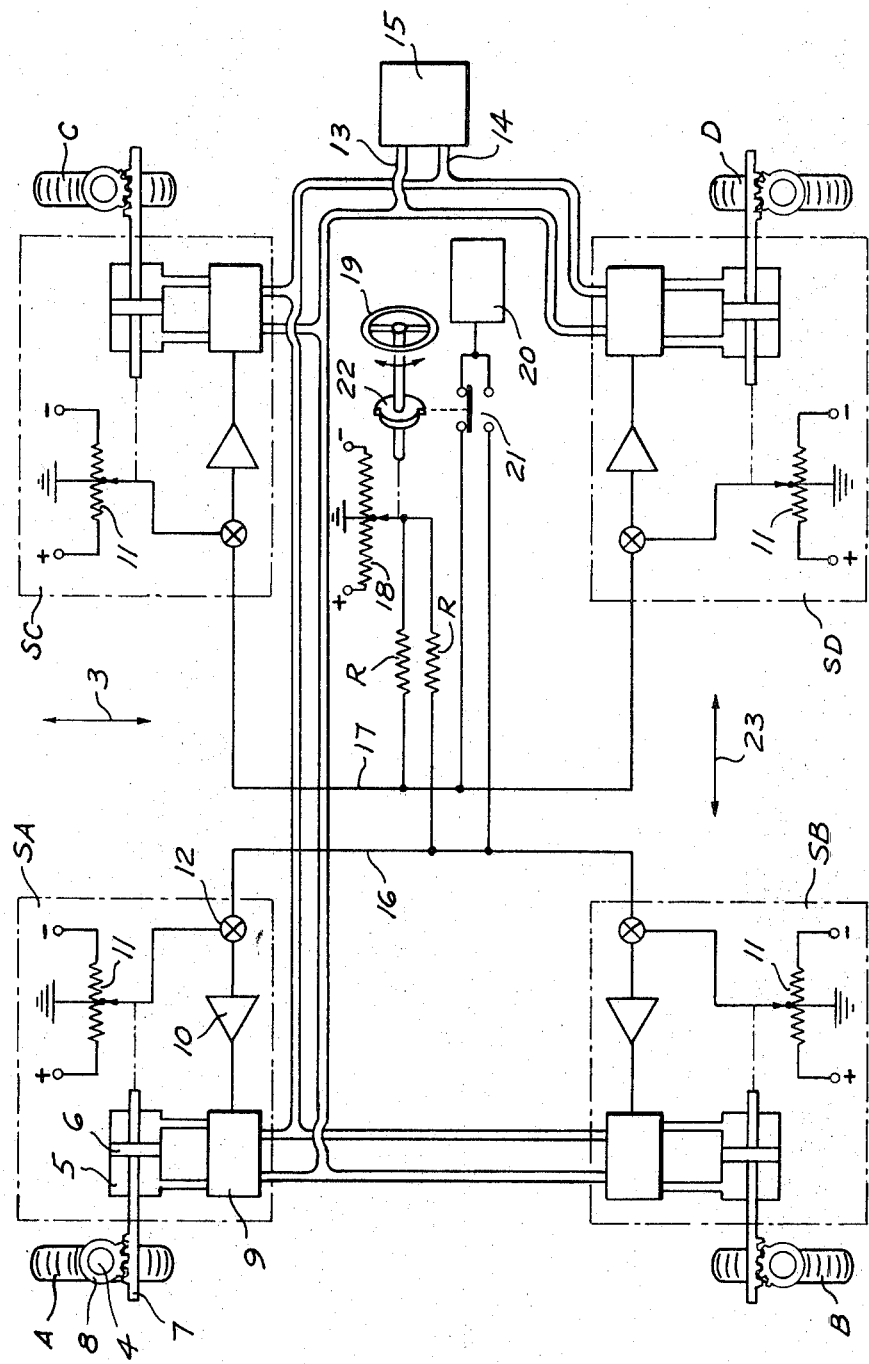
FIG. 3 shows by way of example the schematic diagram for an embodiment of a steering system according to the invention.

FIG. 1 shows very schematically a vehicle 1 having four wheels A, B, C and D which for the steering of the vehicle are all turnable or steerable about a vertical steer axis for each wheel. It is assumed that the vehicle has the driving direction indicated by an arrow 2 and shall turn to the left in the driving direction with the point M as its centre of turning. The wheel base of the vehicle is $2a$, whereas the track width is $b$. The distance between the turning centre M and the junction line between the two inner wheels A and B in the turn is called $c$. The desired steering geometry of the vehicle is that the two inner wheels A, B in the turn shall run along a common arc of a circle C1 having its centre of curvature in the centre of turning M and that also the two outer wheels C, D in the turn shall run along a common arc of a circle C2 also having its centre of curvature in the centre of turning M. If this steering geometry is to be satisfied it is obviously necessary that $$\tan \alpha_1 = \frac{a}{c} \quad (1)$$

$$\tan \alpha_2 = \frac{a}{c+b} \quad (2)$$

i.e.

$$\tan \alpha_2 = \frac{1}{\cot \alpha_1 + k} \quad (3)$$

$$\text{or } \alpha_2 = \arctan \frac{1}{\cot \alpha_1 + k} \quad (3a)$$

where $$k = \frac{b}{a} \quad (4)$$

Obviously $\alpha_1$ is the necessary turning or steering angle for the inner wheels A and B relative to their neutral position for straightahead driving, whereas $\alpha_2$ is the necessary turning or steering angle for the outer wheels C and D relative to their neutral straightahead position.

FIG. 2 is a graphic presentation of the relationship between the steering angle $\alpha_2$ of the outer wheel pair and the steering angle $\alpha_1$ of the inner wheel pair if $k = 2$, that is for a vehicle having its wheels located in the corners of a square. The shape of the graphic curve representing said relationship will obviously change when $k$ is changed, that is when the ratio between the wheel base and the track width of the vehicle is changed.

FIG. 3 shows the principal circuit diagram for a preferred embodiment of a steering system according to the invention for a vehicle with the steering geometry described above.

The drawing shows only schematically the four wheels A, B, C and D of the vehicle in their neutral straightahead positions. Consequently the vehicle has one of the driving directions indicated by the double arrow 3. Each one of the wheels is turnable or steerable about a vertical axis 4 and provided with an electrohydraulic steering servo SA, SB, SC and SD respectively. All these steering servos are of the same design. Thus for instance the steering servo SA for the wheel A comprises a hydraulic servo motor consisting of a double-acting hydraulic cylinder 5 with a piston 6, which is provided with or coupled to a toothed rack 7, which is in engagement with a gear rim 8 on the steering shaft 4 of the wheel, whereby the wheel can be turned or steered by displacement of the piston 6 in the hydraulic cylinder 5. The supply and discharge respectively of hydraulic fluid to and from the two chambers of the hydraulic cylinder 5 is controlled by a valve device 9, which is electrically controlled by the output signal from an amplifier 10 and through hydraulic pipes connected to the outlet 13 and the inlet 14 respectively of a hydraulic fluid pump 15. The piston 6 is also mechanically connected to a signal generator which in the illustrated embodiment of the invention consists of a potentiometer 11 electrically connected to a constant direct voltage source not shown in detail in the drawing. However, also other types of signal generators may be used. The connection between the signal generator and the steering motor of the wheel is such that the signal generator produces an electric signal having a magnitude proportional to the steering or turning angle of the wheel relative to its neutral position and a polarity determined by the direction of the turning of the wheel. The signal from the signal generator 11 is supplied to a comparator 12 to which also the electric input or control signal for the servo SA is supplied. The comparator 12 produces an electric signal representing the difference between the two signals supplied to the comparator and this difference signal is connected to the input of the amplifier 10. It is obvious that the servo SA will operate as an angular positioning servo which turns the wheel to an angle relative to its neutral straightahead position having a magnitude proportional to the amplitude of the electric input signal supplied to the servo and a direction determined by the polarity of this input signal. The steering servos SA and SB for the two wheels A and B respectively which are mounted one after the other in the driving direction of the vehicle have their inputs connected to a common line 16, whereby these wheels A and B are turned through equally large steering angles relative to their neutral positions. The signal generators 11 in the two steering servos SA and SB are, however, connected to the constant direct voltage source with such polarities that the two wheels A and B are steered or turned in opposite directions. In the same way the steering servos SC and SD for the other pair of wheels C and D mounted one after the other in the driving direction of the vehicle have their inputs connected to a common line 17, whereby also the wheels C and D are turned through mutually equally large steering angles from their neutral positions. Also in these steering servos SC and SD the signal generators 11 are connected to the constant direct voltage source with such polarities that the wheels C and D are turned in opposite directions from their neutral positions.

The input or control signals for the steering servos SA, SB, SC and SD of the wheels are supplied from a signal generator which in the illustrated embodiment of the invention consists of a potentiometer 18 electrically connected to the constant direct voltage source and mechanically coupled to a steering wheel 19 or a corresponding steering control member of the vehicle in such a way that it produces an electric signal having an amplitude proportional to the angle of rotation of the steering wheel from a predetermined neutral position and a polarity determined by the direction of rotation of the steering wheel. Of course also other types of signal generators can be used for this purpose. The voltage from the potentiometer 18 is connected through two equally large resistors R to the line 16, that is to the control inputs of the steering servos SA and SB of the wheels A and B, as well as to the line 17, that is to the control inputs of the steering servos SC and SD for the two wheels C and D. With this arrangement equally large control or input signals would in principle be supplied to all the steering servos SA, SB, SC and SD, whereby all the wheels A—D would be turned through equally large steering angles. In order to obtain the relationship between the steering angle of the outer wheel pair and the steering angle of the inner wheel pair in a turn required for the steering geometry discussed in the foregoing, the steering system according to the invention comprises also an electric signal attenuating network 20, which by means of a switching device 21 can be connected alternatively to the line 16, that is to the control inputs for the steering servos of the wheels A and B, or to the line 17, that is to the control inputs for the steering servos of the wheels C and D. The switching device 21 is operated by a cam disc 22 which is mechanically coupled to the steering wheel 19 of the vehicle in such a way that the attenuating network 20 is connected by the switching device 21 to the line 17 when the vehicle is steered in such a direction that the wheel pair C, D constitute the outer wheel pair in the turn, whereas the network 20 is connected through the switching device 21 to the line 16 when the vehicle is steered in such a direction that the wheel pair A, B constitute the outer wheel pair in the turn. The attenuating network 20 attenuates or reduces the input or control signal supplied to the steering servos for the outer wheel pair in the turn in such a way that the desired relationship between the steering angle for the outer wheel pair and the steering angle for the inner wheel pair in the turn necessary for the steering geometry described in the foregoing is always obtained. It is obvious that the attenuating network 20 shall have an attenuation characteristic corresponding to the ratio between the steering angle of the outer wheel pair and the steering angle of the inner wheel pair, that is an attenuation characteristic having the same shape as for instance the curve shown in the diagram in FIG. 2 and corresponding to the expression (3) or (3a) given in the foregoing.

FIG. 4 shows by way of example the circuit diagram for a preferred attenuating network 20. This network comprises in the embodiment shown in the drawing two parallel branches which can be connected alternatively to the line 17 or the line 16 through the switching device 21. One of these parallel branches comprises a resistor R1 connected in series with two diodes D1 connected in parallel with opposite polarities. The other parallel branch comprises in the same manner a resistor R2 connected in series with two diodes D2 connected in parallel with opposite polarities. The diodes D1 and D2 are biased in their reverse direction by means of direct voltage sources E and voltage dividers consisting of resistors R3 and R4. The resistors R3 and R4 are assumed to have resistance values much smaller than the resistors R1 and R2. As can be seen from the drawing, the bias voltage for the two diodes D1 is smaller than the bias voltage for the diodes D2. The bias voltage for the diodes D1 is assumed to be $E_1$, whereas the bias voltage for the diodes D2 is assumed to be $E_2$. If the voltage $E_i$ supplied to the line 17 (16) through the resistor R from the signal generator 18 (compare FIG. 3) is positive, only the left-hand diodes D1 and D2 in FIG. 4 are of importance for the operation of the attenuating network. The right-hand diodes D1 and D2 in FIG. 4 are operative only when the voltage $E_i$ is negative. As long as the voltage $E_i$ from the signal generator 18 (compare FIG. 3) is lower than the bias voltage $E_1$ of the diodes D1, all diodes are nonconducting, wherefore the voltage $E_u$ appearing on the line 17 (16) and thus supplied to the steering servos of the outer wheels in the turn will have substantially the same value as the voltage $E_i$, that is $E_u = E_i$. When the voltage $E_i$ exceeds the bias voltage $E_1$ of the diodes D1, one of these diodes becomes conductive so that current flows through the parallel branch of the attenuating network comprising the resistor $R_1$. This produces a voltage division so that $$E_u = E_i \frac{R_1}{R + R_1}$$

If the voltage $E_i$ increases further so that it exceeds also the bias voltage $E_2$ of the diodes $D_2$, one of these diodes becomes conductive so that current flows also through the parallel branch of the attenuating network comprising the resistor $R_2$. This produces the voltage division $$E_u = E_i \frac{R_1 R_2}{R(R_1 + R_2) + R_1 R_2}$$

FIG. 5 is a diagram illustrating the voltage $E_u$ as a function of the voltage $E_i$ for the attenuating network shown in FIG. 4. It is obvious that the positions of the knee points of the curve can easily be changed by variation of the biasing voltages for the diodes $D_1$ and $D_2$ and that the inclination of the curve between these knee points can also easily be changed by variation of the resistance values for the resistors R1 and R2. Further it is obvious that the number of knee points on the curve can be increased in any desired extent by providing a corresponding larger number of parallel branches in the network. Consequently it is very easy to design the attenuating network in such a way that the relationship between the output voltage $E_u$ of the network and the input voltage $E_i$ to the network corresponds with any desired accuracy to a predetermined relationship between the steering angle $\alpha_2$ of the outer wheel pair and the steering angle $\alpha_1$ of the inner wheel pair when the vehicle is turned, as for instance the relationship illustrated in FIG. 2 and corresponding to the expression (3) or (3a) in the foregoing. If the attenuation characteristic of the network must be changed during the driving of the vehicle, as for instance if the wheel base and/or the track width of the vehicle is changed, this is very easily possible by variation of the resistance values of the resistors R1, R2 in the network and of the bias voltages for the diodes. Such changes of the resistance values of the resistors and the bias voltages of the diodes may be continuous or stepwise changes.

If the vehicle, in the same way as the gantry crane described in the above mentioned patent specification, is to be drivable alternatively in two mutually orthogonal directions, that is also in the direction indicated by an arrow 23 in FIG. 3, this can be achieved by a very simple and easily performed change of the connections in the steering system shown in FIG. 3. It is only necessary that the electrical and mechanical connections of the signal generators 11 in the steering servos of the wheels are changed in such a way that the signal generators produce a zero output signal when the associated wheel A to D are in the neutral straightahead positions indicated by the arrow 23 for the new direction of driving. As with this new direction of driving the wheels A and C constitute the one pair of wheels mounted one after the other in the driving direction and the wheels B and D constitute the other pair of wheels mounted one after the other in the driving direction, it is further necessary that by means of suitable switching devices the input terminals of the steering servos SA and SC for the wheels A and C are joined directly and in a similar way the input terminals of the steering servos SB and SD for the wheels B and D are joined directly. If the wheels of the vehicle are not located in the corners of a square, it will also be necessary by means of suitable switching devices to substitute a new attenuating network for the attenuating network used for the old driving direction, or alternatively the attenuating network used for the earlier driving direction must be given another attenuation characteristic by adjustment of the resistance values and the bias voltages in the network. All changes in the steering system which become necessary when the driving direction is changed consist consequently of electric switching operations which are easily carried out and require only simple switching devices.

I claim:

1. A vehicle provided with four wheels steerable about individual vertical steering axes and comprising a steering system responsive to a steering wheel for turning said steerable wheels about their associated steering axes in such a way that when making a turn with the vehicle the one pair of a fore wheel and a rear wheel mounted one after the other in the driving direction of the vehicle runs along an arc of a first circle common for said one pair of wheels and the other pair of a fore wheel and a rear wheel mounted one after the other in the driving direction of the vehicle runs along an arc of a second circle common for said other pair of wheels and said first and second arcs of circles have substantially the same centre of curvature, characterized in that said steering system comprises; for each of said steerable wheels an electrically controlled servo means for turning the associated wheel about its vertical steering axis to an angle relative to a predetermined neutral position corresponding to an electric control signal supplied to a control signal input of said servo means; an electric signal generator coupled to said steering wheel for producing an electric signal corresponding to the angle of rotation of the steering wheel from a predetermined neutral position, the signal output of said signal generator being electrically connected to the control signal inputs of all said servo means; an electric signal attenuating network; and switching means responsive to the direction of rotation of said steering wheel from its neutral position for connecting said signal attenuating network into the signal connection between said signal generator and the servo means of the pair of wheels which constitute the outer wheel pair in the turn of the vehicle caused by the rotation of the steering wheel; said signal attenuating network having an attenuation factor dependent on the magnitude of the output signal from said signal generator.

2. A vehicle as claimed in claim 1, characterized in that said signal attenuating network has an attenuation characteristic substantially corresponding to the expression $$E_u = \frac{1}{p} \arctan \frac{1}{\cot(p.E_i) + \frac{b}{a}}$$

in which $E_i$ is the signal from said signal generator supplied to the signal attenuating network, $E_u$ is the output signal from the signal attenuating network supplied to the servo means of the outer wheel pair in the turn made by the vehicle, $p$ is the ratio between the angle of turning imparted by a said servo means to the associated wheel and the magnitude of the control signal supplied to said servo means, $a$ is one half of the wheel base of the vehicle and $b$ is the track width of the vehicle.

3. A vehicle as claimed in claim 1, characterized in that said signal attenuating network comprises a number of parallel branches connected to said signal connection and comprising resistances connected in series with diodes biased by bias voltages having different magnitudes for different parallel branches.

4. A vehicle as claimed in claim 3, characterized in that each parallel branch of the signal attenuating network comprises two biased diodes connected in series with the resistance of the parallel branch, said two diodes being connected mutually in parallel with opposite polarities.